(12) United States Patent
Ge et al.

(10) Patent No.: US 10,223,638 B2
(45) Date of Patent: Mar. 5, 2019

(54) CONTROL SYSTEM, METHOD AND DEVICE OF INTELLIGENT ROBOT BASED ON ARTIFICIAL INTELLIGENCE

(71) Applicant: BAIDU ONLINE NETWORK TECHNOLOGY (BEIJING) CO., LTD., Beijing (CN)

(72) Inventors: Xingfei Ge, Beijing (CN); Hua Wu, Beijing (CN); Jialin Li, Beijing (CN); Qian Xu, Beijing (CN); Haifeng Wang, Beijing (CN); Kun Jing, Beijing (CN); Wenyu Sun, Beijing (CN); Tian Wu, Beijing (CN); Daisong Guan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 590 days.

(21) Appl. No.: 14/968,221

(22) Filed: Dec. 14, 2015

(65) Prior Publication Data
US 2016/0379121 A1 Dec. 29, 2016

(30) Foreign Application Priority Data
Jun. 24, 2015 (CN) .......................... 2015 1 0355436

(51) Int. Cl.
*G06N 5/02* (2006.01)
*B25J 11/00* (2006.01)
(Continued)

(52) U.S. Cl.
CPC .......... *G06N 5/022* (2013.01); *B25J 11/0005* (2013.01); *G06K 9/00288* (2013.01);
(Continued)

(58) Field of Classification Search
None
See application file for complete search history.

(56) References Cited

U.S. PATENT DOCUMENTS

| | | |
|---|---|---|
| 8,594,845 B1 | 11/2013 | Gharpure |
| 2012/0268580 A1 | 10/2012 | Kim et al. |
| 2014/0337007 A1 | 11/2014 | Waibel et al. |

FOREIGN PATENT DOCUMENTS

| | | |
|---|---|---|
| CN | 201242685 | 5/2009 |
| CN | 102722186 | 10/2012 |

(Continued)

OTHER PUBLICATIONS

Thrun et al., Probabilistic Algorithms and the Interactive Museum Tour-Guide Robot Minerva, Nov. 2000, The International Journal of Robotics Research, vol. 19, No. 11, pp. 972-999 (Year: 2000).*

(Continued)

*Primary Examiner* — Alan Chen
(74) *Attorney, Agent, or Firm* — Hodgson Russ LLP

(57) ABSTRACT

The present disclosure provides a control system, a control method and a control device of an intelligent robot based on artificial intelligence. The system includes: a decision engine, disposed on the intelligent robot, and configured to generate cloud processing information according to a multimodal input signal, and to send the cloud processing information; and a cloud control center, configured to receive the cloud processing information, to obtain a user demand by analyzing the cloud processing information, and to return the user demand, such that the decision engine controls the intelligent robot according to at least one of the user demand and the multimodal input signal. The control system may make full use of great online information, enhance the capability of the intelligent robot for storage, calculation and processing complex decisions, and mean- (Continued)

while may respond to the user's instruction timely, rapidly and intelligently, and improve the user experience.

12 Claims, 5 Drawing Sheets

(51) Int. Cl.
    *G10L 15/22*     (2006.01)
    *G06K 9/00*     (2006.01)
    *G10L 15/04*     (2013.01)
    *H04W 4/04*     (2009.01)

(52) U.S. Cl.
    CPC .............. *G10L 15/04* (2013.01); *G10L 15/22* (2013.01); *H04W 4/043* (2013.01); *G10L 2015/228* (2013.01)

(56) References Cited

FOREIGN PATENT DOCUMENTS

| | | |
|---|---|---|
| CN | 102868740 | 1/2013 |
| JP | 2007152443 | 6/2007 |
| JP | 2010188429 | 9/2010 |
| JP | 2012108262 | 6/2012 |
| JP | 2012232352 | 11/2012 |
| JP | 2014106523 | 6/2014 |
| JP | 2014176963 | 9/2014 |
| JP | 2014199619 | 10/2014 |
| JP | 2015501438 | 1/2015 |
| JP | 2015050766 | 3/2015 |
| JP | 2015069443 | 4/2015 |
| KR | 20140126539 A | 10/2014 |
| KR | 20150062275 A | 6/2015 |
| WO | 2015037542 | 3/2015 |

OTHER PUBLICATIONS

Yoshimi, et al., Development of a Concept Model of a Robotic Information Home Appliance, ApriAlpha, Proceedings of 2004 IEEE/RSJ International Conference on Intelligent Robots and Systems, vol. 1, pp. 205-211 Sep. 28, 2004.

Stiefelhagen, et al., Enabling Multimodal Homan-Robot Interaction for the Karlsruhe Humanoid Robot, IEEE Transactions on Robotics, vol. 23, No. 5, pp. 840-851 Oct. 5, 2007.

Sugiura, et al., rospeex: A Cloud-based Spoken Language Communication Toolkit for ROS, Proceedings of Workshop of The Institute of Electronics, Information and Communication Engineers, vol. 113, No. 248, pp. 7-10 Oct. 10, 2013.

\* cited by examiner

CONTROL SYSTEM, METHOD AND DEVICE OF INTELLIGENT ROBOT BASED ON ARTIFICIAL INTELLIGENCE

CROSS-REFERENCE TO RELATED APPLICATIONS

This application is based on and claims priority to Chinese Patent Application No. 201510355436.7, filed on Jun. 24, 2015, the entire contents of which are incorporated herein by reference.

FIELD

The present disclosure relates to a smart terminal technology, and more particularly to a control system, a control method and a control device of an intelligent robot based on artificial intelligence.

BACKGROUND

Artificial intelligence (AI for short) is a new technical science studying and developing theories, methods, techniques and application systems for simulating, extending and expanding human intelligence. The artificial intelligence is a branch of computer science, which attempts to know the essence of intelligence and to produce an intelligent robot capable of acting as a human. The researches in this field include robots, speech recognition, image recognition, natural language processing and expert systems, etc. The intelligent robot, as one kind of artificial intelligence product, may be widely used in various aspects such as life, working and scientific discovery. Users have higher and higher requirements for the intelligent robot on the real-time response capability and the capability of processing and analyzing mass data. The users wish the intelligent robot may quickly respond to functions such as movement and navigation, and also wish the intelligent robot has functions such as dialogue interaction and face recognition. Thus, it requires the intelligent robot to have both the capability of rapid response and the capability of storing and processing the mass data. However, the existing intelligent robot cannot satisfy the above demand of users, thus resulting in poor user experience.

SUMMARY

Embodiments of the present disclosure seek to solve at least one of the problems existing in the related art to at least some extent.

Accordingly, a first objective of the present disclosure is to provide a control system of an intelligent robot based on artificial intelligence, which may respond to a user's instruction timely, rapidly and intelligently.

A second objective of the present disclosure is to provide a control method of an intelligent robot based on artificial intelligence.

A third objective of the present disclosure is to provide another control method of an intelligent robot based on artificial intelligence.

A fourth objective of the present disclosure is to provide a control device of an intelligent robot based on artificial intelligence.

A fifth objective of the present disclosure is to provide another control device of an intelligent robot based on artificial intelligence.

In order to achieve above objectives, embodiments of a first aspect of the present disclosure provide a control system of an intelligent robot based on artificial intelligence. The system includes: a decision engine, disposed on the intelligent robot, and configured to generate cloud processing information according to a multimodal input signal received by the intelligent robot, and to send the cloud processing information to a cloud control center analyzing, so as to obtain a user demand, and to control the intelligent robot according to at least one of the user demand and the multimodal input signal; and the cloud control center, configured to receive the cloud processing information, to obtain the user demand by analyzing the cloud processing information, and to return the user demand to the decision engine.

With the control system of the intelligent robot based on artificial intelligence according to embodiments of the present disclosure, the decision engine on the intelligent robot may generate the cloud processing information according to the multimodal input signal received by the intelligent robot, may send the cloud processing information to the cloud control center for analyzing and obtaining the user demand, and may control the intelligent robot according to at least one of the user demand and the multimodal input signal. In this way, the cloud control center may be used to process complex natural language instructions, complex decisions and image recognition, and the local decision engine may be used to control the intelligent robot timely and rapidly according to the input signal, thus making full use of great online information and enhancing the capability of the intelligent robot for storage, calculation and processing complex decisions, while responding to the user's instruction timely, rapidly and intelligently, and improving the user experience.

Embodiments of a second aspect of the present disclosure provide a control method of an intelligent robot based on artificial intelligence. The method includes: generating by a decision engine of the intelligent robot, cloud processing information according to a multimodal input signal received by the intelligent robot; sending by the decision engine, the cloud processing information to a cloud control center for analyzing, so as to obtain a user demand; controlling by the decision engine, the intelligent robot according to at least one of the user demand and the multimodal input signal.

With the control method of the intelligent robot based on artificial intelligence according to embodiments of the present disclosure, the cloud processing information may be generated according to the multimodal input signal received by the intelligent robot and may be sent to the cloud control center for analyzing and obtaining the user demand, and the intelligent robot may be controlled according to at least one of the user demand and the multimodal input signal. In this way, the cloud control center may be used to process complex natural language instructions, complex decisions and image recognition, and the local decision engine may be used to control the intelligent robot timely and rapidly according to the input signal, thus making full use of great online information and enhancing the capability of the intelligent robot for storage, calculation and processing complex decisions, while responding to the user's instruction timely, rapidly and intelligently, and improving the user experience.

Embodiments of a third aspect of the present disclosure provide a control device of an intelligent robot based on artificial intelligence. The control device includes: a generating module, configured to generate cloud processing information according to a multimodal input signal received by the intelligent robot; a sending module, configured to send the cloud processing information to a cloud control center for analyzing, so as to obtain a user demand; and a control module, configured to control the intelligent robot according to at least one of the user demand and the multimodal input signal.

With the control device of the intelligent robot based on artificial intelligence according to embodiments of the present disclosure, the cloud processing information may be generated according to the multimodal input signal received by the intelligent robot and may be sent to the cloud control center for analyzing and obtaining the user demand, and the intelligent robot may be controlled according to at least one of the user demand and the multimodal input signal. In this way, the cloud control center may be used to process complex natural language instructions, complex decisions and image recognition, and the local decision engine may be used to control the intelligent robot timely and rapidly according to the input signal, thus making full use of great online information and enhancing the capability of the intelligent robot for storage, calculation and processing complex decisions, while responding to the user's instruction timely, rapidly and intelligently, and improving the user experience.

Embodiments of a fourth aspect of the present disclosure provide a control method of an intelligent robot based on artificial intelligence. The method includes: receiving by a cloud control center, cloud processing information sent from the intelligent robot; analyzing by the cloud control center, the cloud processing information to obtain a user demand; and returning by the cloud control center, the user demand to the intelligent robot.

With the control method of the intelligent robot based on artificial intelligence according to embodiments of the present disclosure, the cloud processing information sent by the decision engine of the intelligent robot may be received and analyzed for obtaining the user demand, and then the user demand is returned to the decision engine, such that the decision engine controls the intelligent robot according to at least one of the user demand and the multimodal input signal. In this way, the cloud control center may be used to process complex natural language instructions, complex decisions and image recognition, and the local decision engine may be used to control the intelligent robot timely and rapidly according to the input signal, thus making full use of great online information and enhancing the capability of the intelligent robot for storage, calculation and processing complex decisions, while responding to the user's instruction timely, rapidly and intelligently, and improving the user experience.

Embodiments of a fifth aspect of the present disclosure provide a control device of an intelligent robot based on artificial intelligence. The device includes: a receiving module, configured to receive cloud processing information sent by the intelligent robot; an analyzing module, configured to analyze the cloud processing information, so as to obtain a user demand; and a returning module, configured to return the user demand to the intelligent robot.

With the control device of the intelligent robot based on artificial intelligence according to embodiments of the present disclosure, the cloud processing information sent by the decision engine of the intelligent robot may be received and analyzed for obtaining the user demand, and then the user demand is returned to the decision engine, such that the decision engine controls the intelligent robot according to at least one of the user demand and the multimodal input signal. In this way, the cloud control center may be used to process complex natural language instructions, complex decisions and image recognition, and the local decision engine may be used to control the intelligent robot timely and rapidly according to the input signal, thus making full use of great online information and enhancing the capability of the intelligent robot for storage, calculation and processing complex decisions, while responding to the user's instruction timely, rapidly and intelligently, and improving the user experience.

According to a sixth aspect of embodiments of the present disclosure, there is provided a non-transitory computer-readable storage medium having stored therein instructions that, when executed by a processor of a device, causes the device to perform a control method of an intelligent robot based on artificial intelligence, the method including: generating by a decision engine of the intelligent robot, cloud processing information according to a multimodal input signal received by the intelligent robot; sending by the decision engine, the cloud processing information to a cloud control center for analyzing and obtaining a user demand; controlling by the decision engine, the intelligent robot according to at least one of the user demand and the multimodal input signal.

According to a seventh aspect of embodiments of the present disclosure, there is provided a non-transitory computer-readable storage medium having stored therein instructions that, when executed by a processor of a server, causes the server to perform a control method of an intelligent robot based on artificial intelligence, the method including: receiving by a cloud control center, cloud processing information sent from the intelligent robot; analyzing by the cloud control center, the cloud processing information to obtain a user demand; and returning by the cloud control center, the user demand to the intelligent robot.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
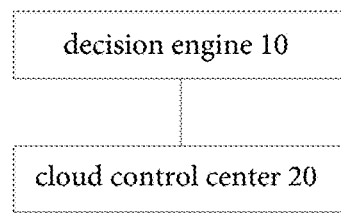
FIG. 1 is a block diagram of a control system of an intelligent robot based on artificial intelligence according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

It should be noted that, in the description of the present disclosure, terms such as "first" and "second" are used herein for purposes of description and are not intended to indicate or imply relative importance or significance.

The present disclosure provides a control system of an intelligent robot based on artificial intelligence. The system includes: a decision engine, disposed on the intelligent robot, and configured to generate cloud processing information according to a multimodal input signal received by the intelligent robot, and to send the cloud processing information to a cloud control center, so as to obtain a user demand, and to control the intelligent robot according to at least one of the user demand and the multimodal input signal; and the cloud control center, configured to receive the cloud processing information, to obtain the user demand by analyzing the cloud processing information, and to return the user demand to the decision engine.

FIG. 1 is a block diagram of a control system of an intelligent robot based on artificial intelligence according to an embodiment of the present disclosure.

As shown in FIG. 1, the control system of the intelligent robot based on artificial intelligence includes a decision engine 10 and a cloud control center 20.

The decision engine 10 is disposed on the intelligent robot and configured to generate cloud processing information according to a multimodal input signal received by the intelligent robot, to send the cloud processing information to the cloud control center 20 for analyzing, so as to obtain a user demand, and to control the intelligent robot according to at least one of the user demand and the multimodal input signal.

The cloud control center 20 is configured to receive the cloud processing information, to analyze the cloud processing information for obtaining the user demand, and to return the user demand to the decision engine 10.

In an embodiment of the present disclosure, the multimodal input signal includes at least one of a speech signal, an image signal and an environment sensor signal. Specifically, the speech signal may be input by the user via a microphone, the image signal may be input via a camera or an infrared sensor, and the environment sensor signal includes the signal input via one or more of an optical sensor, an infrared sensor, a temperature and humidity sensor, a poisonous gas sensor, a particulate pollution sensor, a touch module, a geo-location module and a gravity sensor.

The local decision engine 10 of the intelligent robot has an advantage of rapid response, but has a relatively lower accuracy for speech recognition and image recognition due to limited storage and data processing capability. The cloud control center 20 may make full use of internet resources, and has a super strong processing capability, which may perform semantic analysis, machine translation, sentiment analysis, face recognition and speech recognition by online learning, information retrieval and knowledge question answering or by learning and training mass data, thus having a higher accuracy. However, due to the influence of factors such as network signal coverage and speed, there may be problems such as network delay.

Thus, in embodiments of the present disclosure, if processing the multimodal input signal does not require a very great data processing capability and does not depend on a great amount of online knowledge data but requires various real-time sensor signals, and it requires to control the movement mechanism to make adjustments and response immediately for obtaining optimal signals or avoiding obstacles and to perform new process on the signals obtained after adjustment, then the process may be performed by the decision engine 10 instead of the cloud control center 20 which has a relatively low reliability and a certain delay. For example, the decision engine 10 may perform the sound source localization and the voiceprint recognition according to the speech signal input by the user, sense the surrounding environment according to the image signal and the environment sensor signal, and control the intelligent robot to perform motions such as avoiding obstacles and tracking according to the surrounding environment.

Furthermore, if there is a need to perform the speech recognition, the speech synthesis, the image recognition, as well as the map information collecting and pre-processing, for example, the face recognition, the figure recognition, the motion recognition and the gesture recognition, according to the speech signal, the image signal and the infrared signal in the multimodal input signal, the process may be performed by the cloud control center 20, thus obtaining a more accurate result.

Taking the speech signal as an example, the process on the speech signal may include the speech recognition, the nature language understanding, the semantic analysis, the machine translation and the sentiment analysis, which requires a great amount of corpus and data for training. For interacting with the user, it needs to analyze the user's speech and motion and to determine the response content via knowledge question-answer. Thus, in this case, the speech signal is sent to the cloud control center 20 for analyzing with the super-strong storage and data processing capability of the cloud control center 20.

Certainly, in embodiments of the present disclosure, an offline and online fusion way may be used, i.e., the cloud control center 20 is used preferentially in online case, which performs a relatively accurate recognition or realize a relatively nature speech synthesis effect, and the local decision engine 10 is used in offline case, which may not realize the best effect but can work. In this way, it may take full advantages of both the local decision engine 10 and the cloud control center 20, such that the robot may recognize various signals accurately, and make responses timely and quickly.

Further, in an embodiment of the present disclosure, the decision engine 10 may also be used to perform a primary process on the multimodal input signal, and to send the result after the primary process to the cloud control center 20 as the cloud processing information for further analyzing.

In an embodiment of the present disclosure, the decision engine 10 may divide the speech signal input by the user into a plurality of speech segments, and take the plurality of speech segments as the cloud processing information, and send them to the cloud control center 20 for analyzing. The cloud control center 20 may perform the speech recognition on the plurality of speech segments respectively, and perform one or more of the natural language understanding, the semantic analysis and the sentiment analysis on a result of the speech recognition so as to obtain the user demand, and then return the user demand to the decision engine 10. The decision engine 10 controls the intelligent robot according to the user demand in combination with the multimodal input signal.

Specifically, in an embodiment of the present disclosure, if the user demand is a movement control demand, then the decision engine 10 may obtain a location of the user, generate a map of surrounding area according to at least one of the image signal and the environment sensor signal, sense surrounding environment, and control the intelligent robot to move on the user demand according to the location of the user, the map of surrounding area and the surrounding environment.

Figure 2:
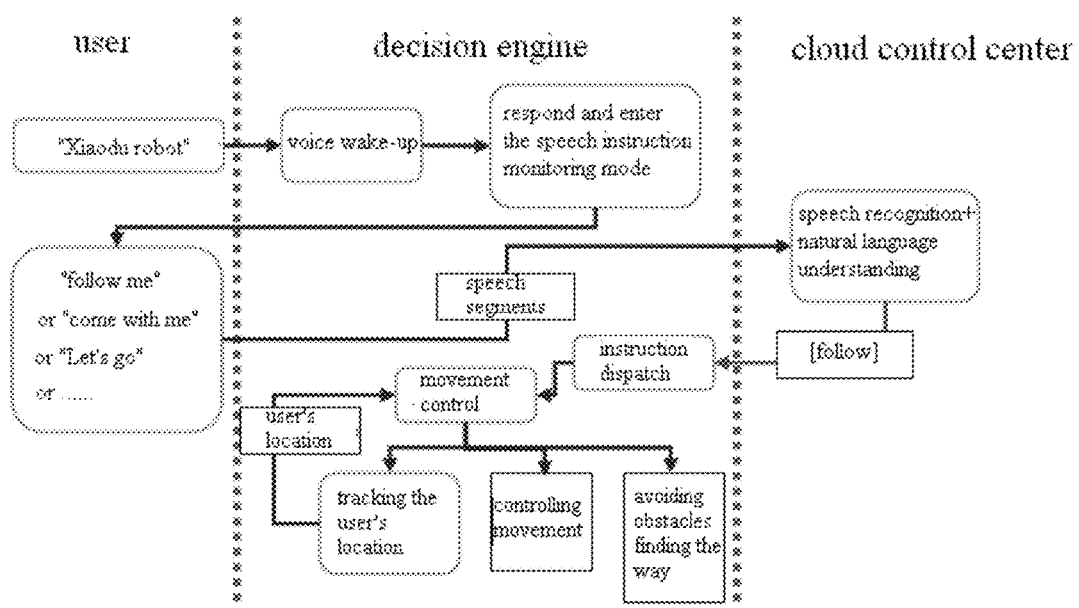
FIG. 2 is a schematic diagram illustrating an application scenario according to an embodiment of the present disclosure.

FIG. 2 is a schematic diagram of an application scenario according to an embodiment of the present disclosure. As shown in FIG. 2, the user may wake up the intelligent robot via the preset speech, for example, if the intelligent robot receives the speech signal "Xiaodu intelligent robot" input by the user, the decision engine 10 may respond to the user, and control the intelligent robot to enter the speech instruction monitoring mode. In this case, if the user inputs speeches such as "follow me", or "come with me" or "Let's go" which are expressed via natural languages, the decision engine 10 may send the speech segments corresponding to the speech to the cloud control center 20 for analyzing. After analyzing, the cloud control center 20 performs semantic understanding and normalization process on the instructions expressed with different speeches, obtain the user demand as the uniform and normative "follow" demand, and return the demand to the decision engine 10. The decision engine 10 performs the instruction dispatch according to the "follow" demand, i.e. calls the movement control program for controlling the intelligent robot to follow the user. Specifically, the decision engine 10 may perform a target tracking on the user so as to obtain the location of the user, for example, may perform the sound source localization on the user according to the speech signal of the user, turn the camera to the user, and control the intelligent robot to move according to the user's location change. Further, during moving, the decision engine 10 may control the intelligent robot to avoid obstacles and find the way according to the map of surrounding area and the surrounding environment.

In addition, if the user demand is a way-finding demand, the decision engine 10 may also generate the map of surrounding area according to at least one of the image signal and the environment sensor signal, obtain the current location and the target location of the intelligent robot, and control the intelligent robot to indicate directions or guide directions via speech interaction according to the map of surrounding area as well as the current location and the target location of the intelligent robot.

Figure 3:
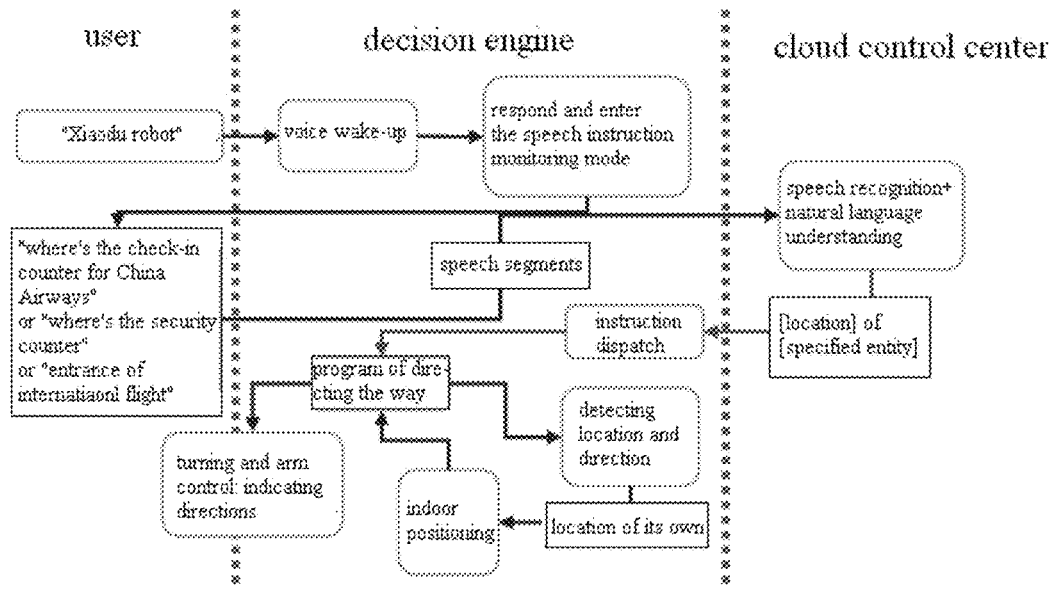
FIG. 3 is a schematic diagram illustrating an application scenario according to another embodiment of the present disclosure.

FIG. 3 is a schematic diagram of an application scenario according to another embodiment of the present disclosure. As shown in FIG. 3, the user may wake up the intelligent robot according to the preset speech, for example, if the intelligent robot receives the speech signal "Xiaodu intelligent robot" input by the user, the decision engine 10 may respond to the user, and control the intelligent robot to enter the speech instruction monitoring mode. In this case, if the user inputs speeches such as "where is the check-in counter for China Airways", "where is the security counter" and "entrance of international flight", the decision engine 10 may send the speech segments corresponding to the speech to the cloud control center 20 for analyzing. After analyzing, the cloud control center 20 obtains the user demand as "location of specified entity" demand, and returns the demand to the decision engine 10. The decision engine 10 performs the instruction dispatch according to the "location of specified entity" demand, i.e. calls the program of directing the way, for controlling the intelligent robot to direct the way for the user. Specifically, the decision engine 10 may detect the location and direction so as to obtain its location, and position itself on the map of surrounding area, and then direct the way for the user according to the relevant location with respect to the specified entity. For example, the intelligent robot may indicate directions via turning and arm movement control, or may indicate directions via outputting speech, and direct the way for the user via speech interaction.

In another embodiment of the present disclosure, the decision engine 10 may detect a movement of the user according to at least one of the image signal and the environment sensor signal. Specifically, the decision engine 10 may recognize the body movement, the gesture and the figure of the user according to the obtained image signal regarding the user, and based on this, detect the movement of the user, such as turn-over and jump. Then, the decision engine 10 sends the movement detection result (as the cloud processing information) to the cloud control center 20 according to a preset rule. For example, the decision engine 10 sends each detected movement and corresponding timestamp (the time when the movement occurs) to the cloud control center 20. The cloud control center 20 may analyze the movement detection result within a certain period and compare the analysis result with a corresponding knowledge base, so as to obtain the user demand, and then return the user demand to the decision engine 10. The decision engine 10 controls the intelligent robot according to the user demand in combination with the multimodal input signal. Specifically, the decision engine 10 may control the intelligent robot to send a prompt message to a preset mobile terminal according to the user demand.

Figure 4:
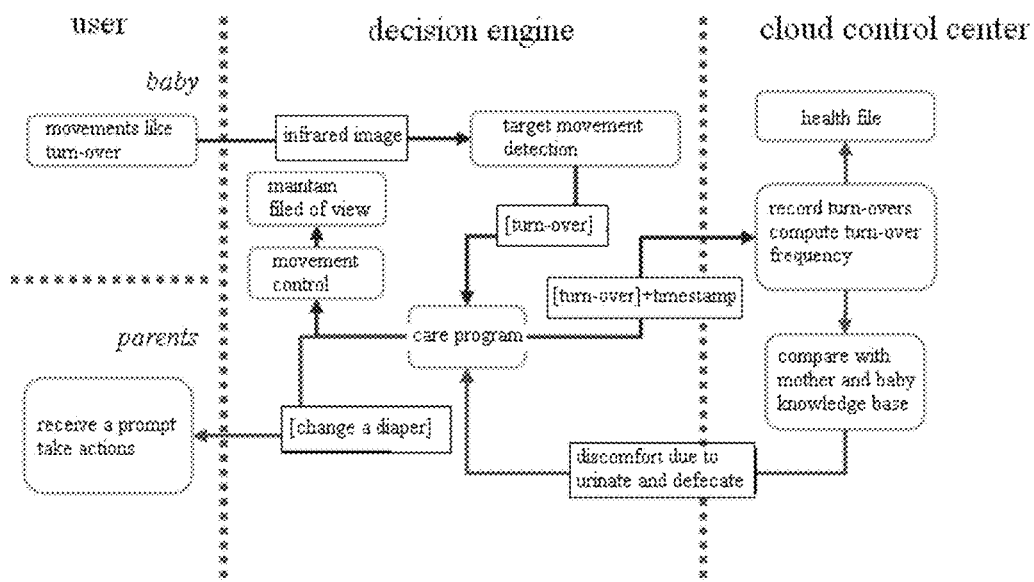
FIG. 4 is a schematic diagram illustrating an application scenario according to yet another embodiment of the present disclosure.

FIG. 4 is a schematic diagram of an application scenario according to yet another embodiment of the present disclosure. As shown in FIG. 4, the decision engine 10 may obtain infrared image of the user (baby), and detect the movement of the user. If the decision engine 10 detects that the user performs the turn-over motion, then the decision engine 10 calls the care program for sending the detected turn-over motion and the corresponding timestamp to the cloud control center 20. The cloud control center 20 may record received motions and their corresponding timestamps, compute a turn-over frequency according to records in a certain period, and compare the turn-over frequency with the mother and baby knowledge base. If the comparison result indicates that the turn-over frequency is caused by discomfort due to urinate and defecate, returns this to the decision engine 10. After receiving the result, the decision engine 10 may call the care program for sending the prompt message "change a diaper" to the preset mobile terminal. In addition, the decision engine 10 may also control the intelligent robot to move with the user's movement, so as to ensure the field of view for obtaining the user's image, and control the intelligent robot according to the user's motion and behavior. In this way, the parents may change a diaper for the baby timely, the comfort of the baby may be improved, and meanwhile the parents may obtain the baby's state conveniently, thus reducing the workload of the parents.

Furthermore, the cloud control center 20 may also establish a health file for the baby according to the baby's turn-over records or other motions in a relatively long period, and further perform the big data analysis and mining based on collecting a great amount of data, so as to find the trend information for businesses such as pushing accurate information and services.

In an embodiment of the present disclosure, the decision engine 10 is also used to perform a face detection on the image signal, and if the image signal is a face image signal, the decision engine 10 sends the face image signal to the cloud control center 20 for face recognition, such that the cloud control center 20 can determine identity information of the user according to the result of the face recognition.

In addition, the decision engine 10 may also perform the voiceprint recognition, so as to determine the user's identity. It should be understood that, in embodiments of the present disclosure, various recognition ways may be used separately or in any combination, so as to provide the more accurate, more extensively applicable, and more convenient identity authentication. If the image quality is poor due to bad lighting conditions, the weight for the voiceprint recognition may be enhanced, and if the speech quality is poor due to noisy environment, the weight for the face recognition may be enhanced. In order to prevent illegal misappropriation, a personal database may be established for the user according to the identity information of the user, such that personalized services may be provided for the user.

Figure 5:
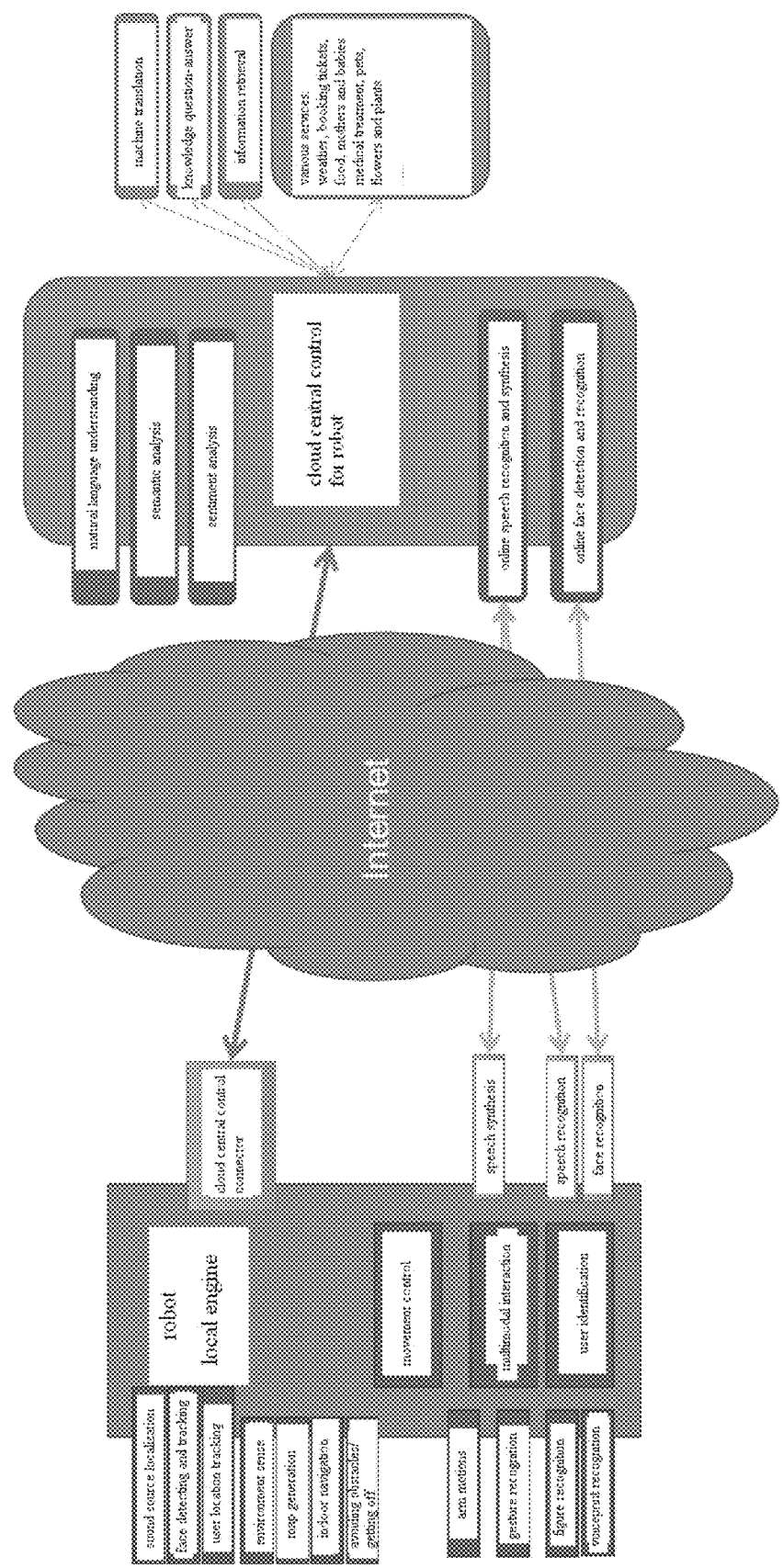
FIG. 5 is a schematic diagram illustrating an interaction in a control system of an intelligent robot based on artificial intelligence according to an embodiment of the present disclosure.

It should be understood that, the above scenarios are only exemplary for the sake of understanding embodiments of the present disclosure. In practical use, especially in practical control process, various control functions and controls of the decision engine 10 may be called on actual control requirements, and combined with online processing results at the cloud control center 20. As shown in FIG. 5, when the intelligent robot is in the online state, the decision engine may send the image signals and speech signals to the cloud control center as the cloud processing information, and the cloud control center performs the online learning, information retrieval, and knowledge question-answer on the multimodal input signal according to online resources and knowledge, or performs the learning and training on mass data, so as to perform the semantic analysis, machine translation, sentiment analysis, face recognition, speech recognition (for example, perform the motion recognition, gesture recognition, figure recognition as well as map information collecting and pre-processing via the cloud server). The decision engine may perform the voiceprint localization on the user according to the speech signal, sense the surrounding environment according to the sensor signal, and control movement mechanism of the intelligent robot according the localization results, the environment sensing results, and the analysis results (such as instructions corresponding to speeches, image recognition results, the map of surrounding area generated according to the image information) returned by the cloud control center, thus realizing movement control on the intelligent robot, such as avoiding obstacles and tracking control. The decision engine may be connected with the cloud control center via the network, thus realizing data transmission.

The decision engine may perform the primary process on the multimodal input signal, and send the processed result to the cloud control center as the cloud processing information. For example, the decision engine may divide the speech signal into speech segments and send the speech segments, or may perform the face recognition on the image signals and send the recognized face images to the cloud control center for face recognition, such that it does not need to send all the image signals, thus reducing the quantity of data transmission.

Furthermore, when the intelligent robot is in the offline state, it cannot communicate with the cloud control center. At this time, the decision engine may perform processing, recognition and analysis, for example, speech recognition, speech synthesis, image recognition, map generation, motion recognition, on the multimodal input signal via built-in programs. No matter whether the intelligent robot is in the online state or in the offline state, it may be controlled to work normally.

Thus, what is transmitted between the decision engine 10 and the cloud control center 20 is instruction-type speech segments as well as abstract and normative instructions such as "follow", or a small number of image signals, which has a small data size, and is quick to transmit and easy to process. Furthermore, the real-time data, such as the great amount of image signals and sensor signals obtained by cameras and sensors, is processed by the decision engine 10, thus avoiding the response delay caused by slow transmission due to the over-large data size. In this way, it may take full advantages of rapid response of the decision engine 10 and the super strong processing capability of the cloud control center 20.

With the control system of the intelligent robot based on artificial intelligence according to embodiments of the present disclosure, the decision engine on the intelligent robot may generate the cloud processing information according to the multimodal input signal received by the intelligent robot, may send the cloud processing information to the cloud control center for analyzing and obtaining the user demand, and may control the intelligent robot according to at least one of the user demand and the multimodal input signal. In this way, the multimodal input signals received by the intelligent robot may be processed by the decision engine and the cloud control center according to the processing capability and the response speed, i.e., the cloud control center may be used to perform efficient process on complex natural language instructions, complex decisions and image recognition, and the local decision engine may be used to control the intelligent robot timely and rapidly according to the input signal, thus making full use of great online information and enhancing the capability of the intelligent robot for storage, calculation and processing complex decisions, while responding to the user's instruction timely, rapidly and intelligently, and improving the user experience.

In order to achieve above embodiments, the present disclosure also provides a control method of an intelligent robot based on artificial intelligence.

The control method may be applied in the decision engine disposed on the intelligent robot.

The control method of the intelligent robot based on artificial intelligence includes following steps: generating by a decision engine of the intelligent robot, cloud processing information according to a multimodal input signal received by the intelligent robot; sending by the decision engine, the cloud processing information to a cloud control center for analyzing, so as to obtain a user demand; controlling by the decision engine, the intelligent robot according to at least one of the user demand and the multimodal input signal.

Figure 6:
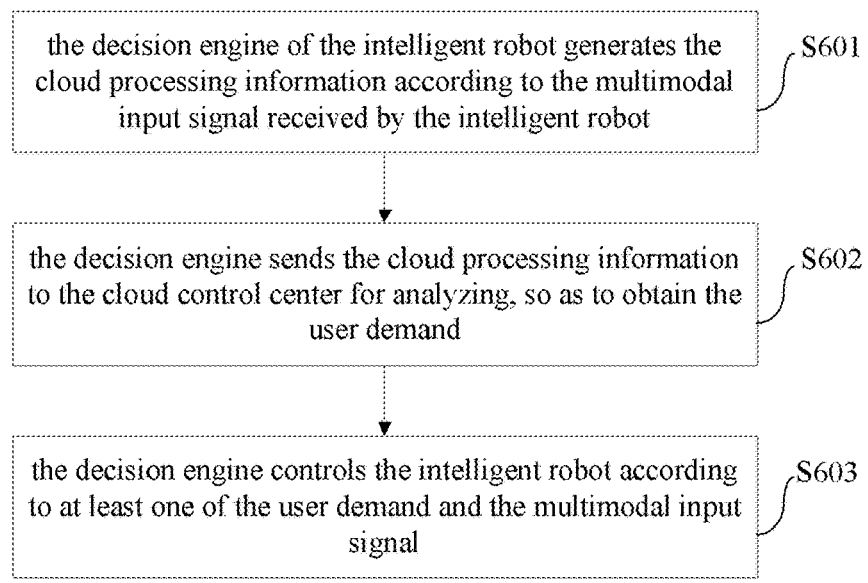
FIG. 6 is a flow chart of a control method of an intelligent robot based on artificial intelligence according to an embodiment of the present disclosure.

FIG. 6 is a flow chart of a control method of an intelligent robot based on artificial intelligence according to an embodiment of the present disclosure.

As shown in FIG. 6, the control method of the intelligent robot based on artificial intelligence includes following steps.

In step S601, a decision engine of the intelligent robot generates cloud processing information according to a multimodal input signal received by the intelligent robot.

In an embodiment of the present disclosure, the multimodal input signal includes at least one of a speech signal, an image signal and an environment sensor signal. Specifically, the speech signal may be input by the user via a microphone, the image signal may be input via a camera or an infrared sensor, and the environment sensor signal includes the signal input via one or more of an optical sensor, an infrared sensor, a temperature and humidity sensor, a poisonous gas sensor, a particulate pollution sensor, a touch module, a geo-location module and a gravity sensor.

In step S602, the decision engine sends the cloud processing information to the cloud control center for analyzing, so as to obtain a user demand.

In step S603, the decision engine controls the intelligent robot according to at least one of the user demand and the multimodal input signal.

The local decision engine of the intelligent robot has an advantage of rapid response, but has a relatively lower accuracy for speech recognition and image recognition due to limited storage and data processing capability. The cloud control center may make full use of internet resources, and has a super strong processing capability, which may perform semantic analysis, machine translation, sentiment analysis, face recognition and speech recognition by online learning, information retrieval and knowledge question answering or by learning and training mass data, thus having a higher accuracy. However, due to the influence of factors such as network signal coverage and speed, there may be problems such as network delay.

Thus, in embodiments of the present disclosure, if processing the multimodal input signal does not require a very great data processing capability and does not depend on a great amount of online knowledge data but requires various real-time sensor signals, and it requires to control the movement mechanism to make adjustments and response immediately for obtaining optimal signals or avoiding obstacles and to perform new process on the signals obtained after adjustment, then the process may be performed by the decision engine instead of the cloud control center which has a relatively low reliability and a certain delay. For example, the decision engine may perform the sound source localization and the voiceprint recognition according to the speech signal, sense the surrounding environment according to the image signal and the environment sensor signal, and control the intelligent robot to perform motions such as avoiding obstacles and tracking according to the surrounding environment.

Furthermore, if there is a need to perform the speech recognition, the speech synthesis, the image recognition, as well as the map information collecting and pre-processing, for example, the face recognition, the figure recognition, the motion recognition and the gesture recognition, according to the speech signal, the image signal and the infrared signal in the multimodal input signal, the process may be performed by the cloud control center, thus obtaining a more accurate result.

Taking the speech signal as an example, the process on the speech signal may include the speech recognition, the nature language understanding, the semantic analysis, the machine translation and the sentiment analysis, which requires a great amount of corpus and data for training. For interacting with the user, it needs to analyze the user's speech and motion and to determine the response content via knowledge question-answer. Thus, in this case, the speech signal is sent to the cloud control center for analyzing with the super-strong storage and data processing capability of the cloud control center.

Certainly, in embodiments of the present disclosure, an offline and online fusion way may be used, i.e., the cloud control center is used preferentially in online case, which performs a relatively accurate recognition or realize a relatively nature speech synthesis effect, and the local decision engine is used in offline case, which may not realize the best effect but can work. In this way, it may take full advantages of both the local decision engine and the cloud control center, such that the robot may recognize various signals accurately, and make responses timely and quickly.

Further, in an embodiment of the present disclosure, the decision engine may also be used to perform a primary process on the multimodal input signal, and to send the result after the primary process to the cloud control center as the cloud processing information for further analyzing.

In an embodiment of the present disclosure, in step S601, the decision engine may divide the speech signal input by the user into a plurality of speech segments, and take the plurality of speech segments as the cloud processing information, and send them to the cloud control center for analyzing. The cloud control center may perform the speech recognition on the plurality of speech segments respectively, and perform one or more of the natural language understanding, the semantic analysis and the sentiment analysis on a result of the speech recognition so as to obtain the user demand, and then return the user demand to the decision engine. The decision engine controls the intelligent robot according to the user demand in combination with the multimodal input signal.

Specifically, in an embodiment of the present disclosure, if the user demand is a movement control demand, then step S603 may specifically include following operations. The decision engine obtains a location of the user, generates a map of surrounding area according to at least one of the image signal and the environment sensor signal, senses surrounding environment, and controls the intelligent robot to move on the user demand according to the location of the user, the map of surrounding area and the surrounding environment.

FIG. 2 is a schematic diagram of an application scenario according to an embodiment of the present disclosure. As shown in FIG. 2, the user may wake up the intelligent robot via the preset speech, for example, if the intelligent robot receives the speech signal "Xiaodu intelligent robot" input by the user, the decision engine may respond to the user, and control the intelligent robot to enter the speech instruction monitoring mode. In this case, if the user inputs speeches such as "follow me", or "come with me" or "Let's go" which are expressed via natural languages, the decision engine may send the speech segments corresponding to the speech to the cloud control center for analyzing. After analyzing, the cloud control center performs semantic understanding and normalization process on the instructions expressed with different speeches, obtain the user demand as the uniform and normative "follow" demand, and return the demand to the decision engine. The decision engine performs the instruction dispatch according to the "follow" demand, i.e. calls the movement control program for controlling the intelligent robot to follow the user. Specifically, the decision engine may perform a target tracking on the user so as to obtain the location of the user, for example, may perform the sound source localization on the user according to the speech signal of the user, turn the camera to the user, and control the intelligent robot to move according to the user's location change. Further, during moving, the decision engine may control the intelligent robot to avoid obstacles and find the way according to the map of surrounding area and the surrounding environment.

In addition, if the user demand is a way-finding demand, then step S603 may also specifically include following operations. The decision engine generates the map of surrounding area according to at least one of the image signal and the environment sensor signal, obtains the current location and the target location of the intelligent robot, and controls the intelligent robot to indicate directions or guide directions via speech interaction according to the map of surrounding area as well as the current location and the target location of the intelligent robot.

FIG. 3 is a schematic diagram of an application scenario according to another embodiment of the present disclosure. As shown in FIG. 3, the user may wake up the intelligent robot according to the preset speech, for example, if the intelligent robot receives the speech signal "Xiaodu intelligent robot" input by the user, the decision engine may respond to the user, and control the intelligent robot to enter the speech instruction monitoring mode. In this case, if the user inputs speeches such as "where is the check-in counter for China Airways", "where is the security counter" and "entrance of international flight", the decision engine may send the speech segments corresponding to the speech to the cloud control center for analyzing. After analyzing, the cloud control center obtains the user demand as "location of specified entity" demand, and returns the demand to the decision engine. The decision engine performs the instruction dispatch according to the "location of specified entity" demand, i.e. calls the program of directing the way, for controlling the intelligent robot to direct the way for the user. Specifically, the decision engine may detect the location and direction so as to obtain its location, and position itself on the map of surrounding area, and then direct the way for the user according to the relevant location with respect to the specified entity. For example, the intelligent robot may indicate directions via turning and arm movement control, or may indicate directions via outputting speech, and direct the way for the user via speech interaction.

In another embodiment of the present disclosure, in step S601, the decision engine may detect a movement of the user according to at least one of the image signal and the environment sensor signal. Specifically, the decision engine may recognize the body movement, the gesture and the figure of the user according to the obtained image signal regarding the user, and based on this, detect the movement of the user, such as turn-over and jump. Then, the decision engine sends the movement detection result (as the cloud processing information) to the cloud control center according to a preset rule. For example, the decision engine sends each detected movement and corresponding timestamp (the time when the movement occurs) to the cloud control center. The cloud control center may analyze the movement detection result within a certain period and compare the analysis result with a corresponding knowledge base, so as to obtain the user demand, and then return the user demand to the decision engine. The decision engine controls the intelligent robot according to the user demand in combination with the multimodal input signal. Specifically, the decision engine may control the intelligent robot to send a prompt message to a preset mobile terminal according to the user demand.

FIG. 4 is a schematic diagram of an application scenario according to yet another embodiment of the present disclosure. As shown in FIG. 4, the decision engine may obtain infrared image of the user (baby), and detect the movement of the user. If the decision engine detects that the user performs the turn-over motion, then the decision engine calls the care program for sending the detected turn-over motion and the corresponding timestamp to the cloud control center. The cloud control center may record received motions and their corresponding timestamps, compute a turn-over frequency according to records in a certain period, and compare the turn-over frequency with the mother and baby knowledge base. If the comparison result indicates that the turn-over frequency is caused by discomfort due to urinate and defecate, returns this to the decision engine. After receiving the result, the decision engine may call the care program for sending the prompt message "change a diaper" to the preset mobile terminal. In addition, the decision engine may also control the intelligent robot to move with the user's movement, so as to ensure the field of view for obtaining the user's image, and control the intelligent robot according to the user's motion and behavior. In this way, the parents may change a diaper for the baby timely, the comfort of the baby may be improved, and meanwhile the parents may obtain the baby's state conveniently, thus reducing the workload of the parents.

Furthermore, the cloud control center may also establish a health file for the baby according to the baby's turn-over records or other motions in a relatively long period, and further perform the big data analysis and mining based on collecting a great amount of data, so as to find the trend information for businesses such as pushing accurate information and services.

In an embodiment of the present disclosure, the method may further include: performing a face detection by the decision engine on the image signal; and if the image signal is a face image signal, sending by the decision engine, the face image signal to the cloud control center for face recognition, such that the cloud control center can determine identity information of the user according to the result of the face recognition.

In addition, the decision engine may also perform the voiceprint recognition, so as to determine the user's identity.

It should be understood that, in embodiments of the present disclosure, various recognition ways may be used separately or in any combination, so as to provide the more accurate, more extensively applicable, and more convenient identity authentication. If the image quality is poor due to bad lighting conditions, the weight for the voiceprint recognition may be enhanced, and if the speech quality is poor due to noisy environment, the weight for the face recognition may be enhanced. In order to prevent illegal misappropriation, a personal database may be established for the user according to the identity information of the user, such that personalized services may be provided for the user.

It should be understood that, the above scenarios are only exemplary for the sake of understanding embodiments of the present disclosure. In practical use, especially in practical control process, various control functions and controls of the decision engine may be called based on actual control requirements, and combined with online processing results at the cloud control center. As shown in FIG. 5, when the intelligent robot is in the online state, the decision engine may send the image signals and speech signals to the cloud control center as the cloud processing information, and the cloud control center performs the online learning, information retrieval, and knowledge question-answer on the multimodal input signal according to online resources and knowledge, or performs the learning and training on mass data, so as to perform the semantic analysis, machine translation, sentiment analysis, face recognition, speech recognition (for example, perform the motion recognition, gesture recognition, figure recognition as well as map information collecting and pre-processing via the cloud server). The decision engine may perform the voiceprint localization on the user according to the speech signal, sense the surrounding environment according to the sensor signal, and control movement mechanism of the intelligent robot according the localization results, the environment sensing results, and the analysis results (such as instructions corresponding to speeches, image recognition results, the map of surrounding area generated according to the image information) returned by the cloud control center, thus realizing movement control on the intelligent robot, such as avoiding obstacles and tracking control. The decision engine may be connected with the cloud control center via the network, thus realizing data transmission.

The decision engine may perform the primary process on the multimodal input signal, and send the processed result to the cloud control center as the cloud processing information. For example, the decision engine may divide the speech signal into speech segments and send the speech segments, or may perform the face recognition on the image signals and send the recognized face images to the cloud control center for face recognition, such that it does not need to send all the image signals, thus reducing the quantity of data transmission.

Furthermore, when the intelligent robot is in the offline state, it cannot communicate with the cloud control center. At this time, the decision engine may perform processing, recognition and analysis, for example, speech recognition, speech synthesis, image recognition, map generation, motion recognition, on the multimodal input signal via built-in programs. No matter whether the intelligent robot is in the online state or in the offline state, it may be controlled to work normally.

Thus, what is transmitted between the decision engine and the cloud control center is instruction-type speech segments as well as abstract and normative instructions such as "follow", or a small number of image signals, which has a small data size, and is quick to transmit and easy to process. Furthermore, the real-time data, such as the great amount of image signals and sensor signals obtained by cameras and sensors, is processed by the decision engine, thus avoiding the response delay caused by slow transmission due to the over-large data size. In this way, it may take full advantages of rapid response of the decision engine and the super strong processing capability of the cloud control center.

With the control method of the intelligent robot based on artificial intelligence according to embodiments of the present disclosure, the decision engine on the intelligent robot may generate the cloud processing information according to the multimodal input signal received by the intelligent robot, may send the cloud processing information to the cloud control center for analyzing and obtaining the user demand, and may control the intelligent robot according to at least one of the user demand and the multimodal input signal. In this way, the multimodal input signals received by the intelligent robot may be processed by the decision engine and the cloud control center according to the processing capability and the response speed, i.e., the cloud control center may be used to perform efficient process on complex natural language instructions, complex decisions and image recognition, and the local decision engine may be used to control the intelligent robot timely and rapidly according to the input signal, thus making full use of great online information and enhancing the capability of the intelligent robot for storage, calculation and processing complex decisions, while responding to the user's instruction timely, rapidly and intelligently, and improving the user experience.

In order to achieve above embodiments, the present disclosure also provides another control device of an intelligent robot based on artificial intelligence.

The control device may be applied in the intelligent robot, for example, may be the decision engine of the intelligent robot.

The control device of the intelligent robot based on artificial intelligence includes: a generating module, configured to generate cloud processing information according to a multimodal input signal received by the intelligent robot; a sending module, configured to send the cloud processing information to a cloud control center for analyzing, so as to obtain a user demand; and a control module, configured to control the intelligent robot according to at least one of the user demand and the multimodal input signal.

Figure 7A:
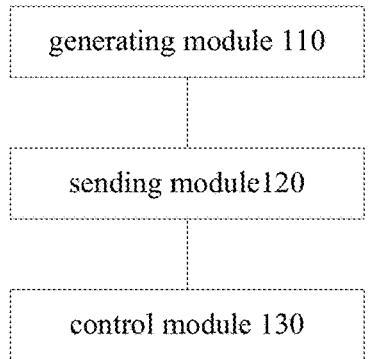
FIG. 7a is a block diagram of a control device of an intelligent robot based on artificial intelligence according to an embodiment of the present disclosure.

FIG. 7a is a block diagram of a control device of an intelligent robot based on artificial intelligence according to an embodiment of the present disclosure.

As shown in FIG. 7a, the control device of the intelligent robot based on artificial intelligence includes a generating module 110, a sending module 120 and a control module 130.

Specifically, the generating module 110 is configured to generate cloud processing information according to a multimodal input signal received by the intelligent robot.

In an embodiment of the present disclosure, the multimodal input signal includes at least one of a speech signal, an image signal and an environment sensor signal. Specifically, the speech signal may be input by the user via a microphone, the image signal may be input via a camera or an infrared sensor, and the environment sensor signal includes the signal input via one or more of an optical sensor, an infrared sensor, a temperature and humidity sensor, a poisonous gas sensor, a particulate pollution sensor, a touch module, a geo-location module and a gravity sensor.

The sending module 120 is configured to send the cloud processing information to a cloud control center for analyzing, so as to obtain a user demand.

The control module 130 is configured to control the intelligent robot according to at least one of the user demand and the multimodal input signal.

The local decision engine of the intelligent robot has an advantage of rapid response, but has a relatively lower accuracy for speech recognition and image recognition due to limited storage and data processing capability. The cloud control center may make full use of internet resources, and has a super strong processing capability, which may perform semantic analysis, machine translation, sentiment analysis, face recognition and speech recognition by online learning, information retrieval and knowledge question answering or by learning and training mass data, thus having a higher accuracy. However, due to the influence of factors such as network signal coverage and speed, there may be problems such as network delay.

Thus, in embodiments of the present disclosure, if processing the multimodal input signal does not require a very great data processing capability and does not depend on a great amount of online knowledge data but requires various real-time sensor signals, and it requires to control the movement mechanism to make adjustments and response immediately for obtaining optimal signals or avoiding obstacles and to perform new process on the signals obtained after adjustment, then the process may be performed by the decision engine instead of the cloud control center which has a relatively low reliability and a certain delay. For example, the decision engine may perform the sound source localization and the voiceprint recognition according to the speech signal input by the user, sense the surrounding environment according to the image signal and the environment sensor signal, and control the intelligent robot to perform motions such as avoiding obstacles and tracking according to the surrounding environment.

Furthermore, if there is a need to perform the speech recognition, the speech synthesis, the image recognition, as well as the map information collecting and pre-processing, for example, the face recognition, the figure recognition, the motion recognition and the gesture recognition, according to the speech signal, the image signal and the infrared signal in the multimodal input signal, the multimodal signal may be sent by the sending module 120 to the cloud control center for analyzing, thus obtaining a more accurate result.

Taking the speech signal as an example, the process on the speech signal may include the speech recognition, the nature language understanding, the semantic analysis, the machine translation and the sentiment analysis, which requires a great amount of corpus and data for training. For interacting with the user, it needs to analyze the user's speech and motion and to determine the response content via knowledge question-answer. Thus, in this case, the speech signal is sent to the cloud control center for analyzing with the super-strong storage and data processing capability of the cloud control center.

Certainly, in embodiments of the present disclosure, an offline and online fusion way may be used, i.e., the cloud control center is used preferentially in online case, which performs a relatively accurate recognition or realize a relatively nature speech synthesis effect, and the local decision engine is used in offline case, which may not realize the best effect but can work. In this way, it may take full advantages of both the local decision engine and the cloud control center, such that the robot may recognize various signals accurately, and make responses timely and quickly.

Further, in an embodiment of the present disclosure, the generating module 110 may also be used to perform a primary process on the multimodal input signal, and to take the result after primary process as the cloud processing information. Then, the result after the primary process is sent by the sending module 120 to the cloud control center for further analyzing.

In an embodiment of the present disclosure, the generating module 110 may divide the speech signal input by the user into a plurality of speech segments, and take the plurality of speech segments as the cloud processing information. Then, the sending module 120 sends them to the cloud control center for analyzing. The cloud control center may perform the speech recognition on the plurality of speech segments respectively, and perform one or more of the natural language understanding, the semantic analysis and the sentiment analysis on a result of the speech recognition so as to obtain the user demand, and then return the user demand. The control module 130 controls the intelligent robot according to the user demand in combination with the multimodal input signal.

Specifically, in an embodiment of the present disclosure, if the user demand is a movement control demand, then the control module 130 may be specifically configured to: obtain a location of the user, generate a map of surrounding area according to at least one of the image signal and the environment sensor signal, sense surrounding environment, and control the intelligent robot to move on the user demand according to the location of the user, the map of surrounding area and the surrounding environment.

FIG. 2 is a schematic diagram of an application scenario according to an embodiment of the present disclosure. As shown in FIG. 2, the user may wake up the intelligent robot via the preset speech, for example, if the intelligent robot receives the speech signal "Xiaodu intelligent robot" input by the user, the intelligent robot may respond to the user, and may be controlled to enter the speech instruction monitoring mode. In this case, if the user inputs speeches such as "follow me", or "come with me" or "Let's go" which are expressed via natural languages, the sending module 120 may send the speech segments corresponding to the speech to the cloud control center for analyzing. After analyzing, the cloud control center performs semantic understanding and normalization process on the instructions expressed with different speeches, obtain the user demand as the uniform and normative "follow" demand, and return the demand to the intelligent robot. The control module 130 performs the instruction dispatch according to the "follow" demand, i.e. calls the movement control program for controlling the intelligent robot to follow the user. Specifically, the control module 130 may perform a target tracking on the user so as to obtain the location of the user, for example, may perform the sound source localization on the user according to the speech signal of the user, turn the camera to the user, and control the intelligent robot to move according to the user's location change. Further, during moving, the control module 130 may control the intelligent robot to avoid obstacles and find the way according to the map of surrounding area and the surrounding environment.

In addition, if the user demand is a way-finding demand, the control module 130 may also be specifically configured to: generate the map of surrounding area according to at least one of the image signal and the environment sensor signal, obtain the current location and the target location of the intelligent robot, and control the intelligent robot to indicate directions or guide directions via speech interaction according to the map of surrounding area as well as the current location and the target location of the intelligent robot.

FIG. 3 is a schematic diagram of an application scenario according to another embodiment of the present disclosure. As shown in FIG. 3, the user may wake up the intelligent robot according to the preset speech, for example, if the intelligent robot receives the speech signal "Xiaodu intelligent robot" input by the user, the intelligent robot may respond to the user, and may be controlled to enter the speech instruction monitoring mode. In this case, if the user inputs speeches such as "where is the check-in counter for China Airways", "where is the security counter" and "entrance of international flight", the sending module 120 may send the speech segments corresponding to the speech to the cloud control center for analyzing. After analyzing, the cloud control center obtains the user demand as "location of specified entity" demand, and returns the demand to the intelligent robot. The control module 130 performs the instruction dispatch according to the "location of specified entity" demand, i.e. calls the program of directing the way, for controlling the intelligent robot to direct the way for the user. Specifically, the control module 130 may detect the location and direction so as to obtain its location, and position itself on the map of surrounding area, and then direct the way for the user according to the relevant location with respect to the specified entity. For example, the intelligent robot may indicate directions via turning and arm movement control, or may indicate directions via outputting speech, and direct the way for the user via speech interaction.

In another embodiment of the present disclosure, the generating module 110 may detect a movement of the user according to at least one of the image signal and the environment sensor signal. Specifically, the generating module 110 may recognize the body movement, the gesture and the figure of the user according to the obtained image signal regarding the user, and based on this, detect the movement of the user, such as turn-over and jump. Then, the movement detection result is used as the cloud processing information and sent to the cloud control center according to a preset rule for analyzing. For example, each detected movement and corresponding timestamp (the time when the movement occurs) is sent to the cloud control center. The cloud control center may analyze the movement detection result within a certain period and compare the analysis result with a corresponding knowledge base, so as to obtain the user demand, and then return the user demand to the intelligent robot. The control module 130 controls the intelligent robot according to the user demand in combination with the multimodal input signal. Specifically, the control module 130 may control the intelligent robot to send a prompt message to a preset mobile terminal according to the user demand.

FIG. 4 is a schematic diagram of an application scenario according to yet another embodiment of the present disclosure. As shown in FIG. 4, the generating module 110 may obtain infrared image of the user (baby), and detect the movement of the user. If the generating module 110 detects that the user performs the turn-over motion, then it calls the care program for sending the detected turn-over motion and the corresponding timestamp to the cloud control center. The cloud control center may record received motions and their corresponding timestamps, compute a turn-over frequency according to records in a certain period, and compare the turn-over frequency with the mother and baby knowledge base. If the comparison result indicates that the turn-over frequency is caused by discomfort due to urinate and defecate, this result is returned to the intelligent robot. After receiving the result, the control module 130 may call the care program for sending the prompt message "change a diaper" to the preset mobile terminal. In addition, the control module 130 may also control the intelligent robot to move with the user's movement, so as to ensure the field of view for obtaining the user's image, and control the intelligent robot according to the user's motion and behavior. In this way, the parents may change a diaper for the baby timely, the comfort of the baby may be improved, and meanwhile the parents may obtain the baby's state conveniently, thus reducing the workload of the parents.

Furthermore, the cloud control center may also establish a health file for the baby according to the baby's turn-over records or other motions in a relatively long period, and further perform the big data analysis and mining based on collecting a great amount of data, so as to find the trend information for businesses such as pushing accurate information and services.

It should be understood that, the above scenarios are only exemplary for the sake of understanding embodiments of the present disclosure. In practical use, especially in practical control process, various control functions and controls of the decision engine may be called on actual control requirements, and combined with online processing results at the cloud control center. As shown in FIG. 5, when the intelligent robot is in the online state, the decision engine may send the image signals and speech signals to the cloud control center as the cloud processing information, and the cloud control center performs the online learning, information retrieval, and knowledge question-answer on the multimodal input signal according to online resources and knowledge, or performs the learning and training on mass data, so as to perform the semantic analysis, machine translation, sentiment analysis, face recognition, speech recognition (for example, perform the motion recognition, gesture recognition, figure recognition as well as map information collecting and pre-processing via the cloud server). The decision engine may perform the voiceprint localization on the user according to the speech signal, sense the surrounding environment according to the sensor signal, and control movement mechanism of the intelligent robot according the localization results, the environment sensing results, and the analysis results (such as instructions corresponding to speeches, image recognition results, the map of surrounding area generated according to the image information) returned by the cloud control center, thus realizing movement control on the intelligent robot, such as avoiding obstacles and tracking control. The decision engine may be connected with the cloud control center via the network, thus realizing data transmission.

The decision engine may perform the primary process on the multimodal input signal, and send the processed result to the cloud control center as the cloud processing information. For example, the decision engine may divide the speech signal into speech segments and send the speech segments, or may perform the face recognition on the image signals and send the recognized face images to the cloud control center for face recognition, such that it does not need to send all the image signals, thus reducing the quantity of data transmission.

Furthermore, when the intelligent robot is in the offline state, it cannot communicate with the cloud control center. At this time, the decision engine may perform processing, recognition and analysis, for example, speech recognition, speech synthesis, image recognition, map generation, motion recognition, on the multimodal input signal via built-in programs. No matter whether the intelligent robot is in the online state or in the offline state, it may be controlled to work normally.

Thus, what is transmitted between the decision engine and the cloud control center is instruction-type speech segments as well as abstract and normative instructions such as "follow", or a small number of image signals, which has a small data size, and is quick to transmit and easy to process. Furthermore, the real-time data, such as the great amount of image signals and sensor signals obtained by cameras and sensors, is processed by the decision engine, thus avoiding the response delay caused by slow transmission due to the over-large data size. In this way, it may take full advantages of rapid response of the decision engine and the super strong processing capability of the cloud control center.

With the control device of the intelligent robot based on artificial intelligence according to embodiments of the present disclosure, the cloud processing information may be generated according to the multimodal input signal received by the intelligent robot and sent to the cloud control center for analyzing and obtaining the user demand, and the intelligent robot may be controlled according to at least one of the user demand and the multimodal input signal. In this way, the multimodal input signals received by the intelligent robot may be processed at local or at the cloud control center according to the processing capability and the response speed, i.e., the cloud control center may be used to perform efficient process on complex natural language instructions, complex decisions and image recognition, and the intelligent robot may also be controlled timely and rapidly according to the input signal via local processing, thus making full use of great online information and enhancing the capability of the intelligent robot for storage, calculation and processing complex decisions, while responding to the user's instruction timely, rapidly and intelligently, and improving the user experience.

Figure 7B:
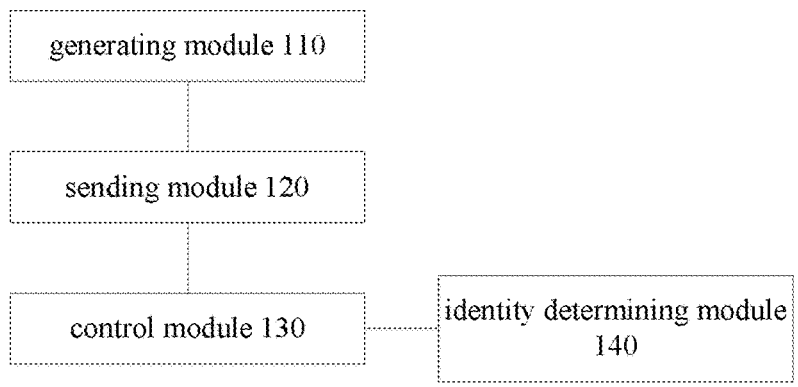
FIG. 7b is a block diagram of a control device of an intelligent robot based on artificial intelligence according to yet another embodiment of the present disclosure.

FIG. 7b is a block diagram of a control device of an intelligent robot based on artificial intelligence according to yet another embodiment of the present disclosure.

As shown in FIG. 7b, based on the embodiment shown in FIG. 7a, the control device of the intelligent robot based on artificial intelligence further includes an identity determining module 140.

Specifically, the identity determining module 140 is configured to perform a face detection on the image signal to determine whether the image signal is a face image signal, to send the face image signal to the cloud control center for face recognition if the image signal is the face image signal, and to determine identity information of the user according to a result of the face recognition.

In addition, the decision engine may also perform the voiceprint recognition, so as to determine the user's identity.

It should be understood that, in embodiments of the present disclosure, various recognition ways may be used separately or in any combination, so as to provide the more accurate, more extensively applicable, and more convenient identity authentication. If the image quality is poor due to bad lighting conditions, the weight for the voiceprint recognition may be enhanced, and if the speech quality is poor due to noisy environment, the weight for the face recognition may be enhanced. In order to prevent illegal misappropriation, a personal database may be established for the user according to the identity information of the user, such that personalized services may be provided for the user.

In order to achieve above embodiments, the present disclosure also provides another control method of an intelligent robot based on artificial intelligence.

The control method may be applied in the cloud control center.

The control method of the intelligent robot based on artificial intelligence includes following steps: receiving by a cloud control center, cloud processing information sent from the intelligent robot; analyzing by the cloud control center, the cloud processing information to obtain a user demand; and returning by the cloud control center, the user demand to the intelligent robot.

Figure 8:
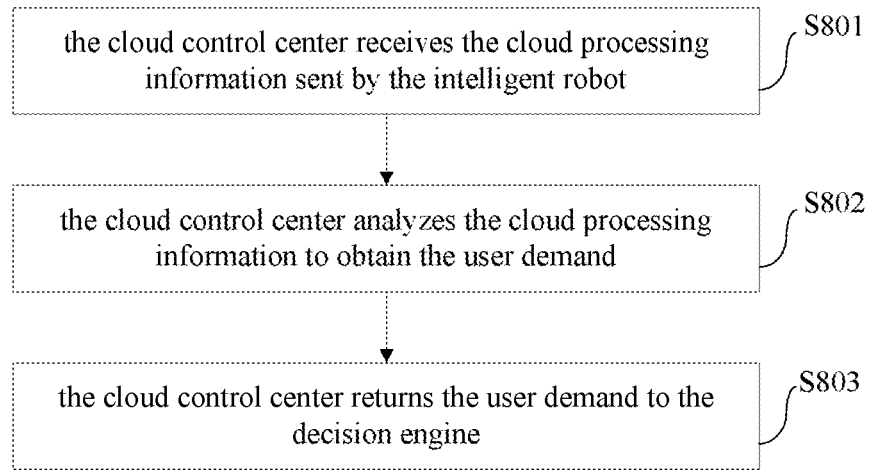
FIG. 8 is a flow chart of a control method of an intelligent robot based on artificial intelligence according to another embodiment of the present disclosure.

FIG. 8 is a flow chart of a control method of an intelligent robot based on artificial intelligence according to another embodiment of the present disclosure.

As shown in FIG. 8, the control method of the intelligent robot based on artificial intelligence includes following steps.

In step S801, the cloud control center receives cloud processing information sent by the intelligent robot.

In embodiments of the present disclosure, the cloud processing information may be generated by the decision engine of the intelligent robot according to the multimodal input signal. The cloud processing information may include a plurality of speech segments obtained by the decision engine through dividing the speech signal input by the user, detected face images, and movement detection results (such as gesture actions, body actions), in which the multimodal input signal includes at least one of the speech signal, the image signal and the environment sensor signal. Specifically, the speech signal may be input by the user via a microphone, the image signal may be input via a camera or an infrared sensor, and the environment sensor signal includes the signal input via one or more of an optical sensor, an infrared sensor, a temperature and humidity sensor, a poisonous gas sensor, a particulate pollution sensor, a touch module, a geo-location module and a gravity sensor.

In step S802, the cloud control center analyzes the cloud processing information to obtain a user demand.

In step S803, the cloud control center returns the user demand to the decision engine.

In an embodiment of the present disclosure, if the cloud processing information includes the plurality of speech segments, then step S802 specifically includes: performing a speech recognition on the plurality of speech segments respectively; and performing one or more of natural language understanding, semantic analysis and sentiment analysis on a result of the speech recognition, so as to obtain the user demand.

In an embodiment of the present disclosure, if the cloud processing information is the movement detection result, then step S802 specifically includes: performing a statistical analysis on the movement detection result, and comparing an analysis result with a corresponding knowledge base, so as to obtain the user demand.

In an embodiment of the present disclosure, if the cloud processing information is the face image, then step S802 specifically includes: performing a face recognition on the face image, and returning a result of the face recognition to the intelligent robot.

In embodiments of the present disclosure, the decision engine may perform process on the multimodal input signal, for example, may perform a sound source localization and a voiceprint recognition according to the speech signal input by the user, may generate surrounding environment and a map of surrounding area according to the image signals and the environment sensor signals, or may recognize body actions, gestures and figures of the user according to the image signals.

Processing the above signals does not need a very great data processing capability and does not depend on a great amount of online knowledge data, and thus can be performed by the decision engine. However, for the processing of analyzing the user demand depending on a great amount of data, corpus and knowledge, if it is still performed by the decision engine, then problems such as process failure or long consumed time may be caused due to limited data processing capability of the decision engine. For example, for processing the speech signal, speech recognition, natural language understanding, semantic analysis, machine translation and sentiment analysis should be performed, which requires a great amount of corpus and data for training; for interacting with the user, it requires to analyze the meanings of the user's speech and actions and to determine the response content via knowledge question-answer. Thus, in this case, the speech signals should be sent to the cloud control center, such that the cloud control center analyzes the speech signals with the super strong storage and data processing capability, so as to obtain the user demand. Then, the decision engine controls the intelligent robot according to the user demand in combination with the multimodal input signal.

Detailed descriptions may refer to application scenario examples shown in FIGS. 2-4.

It should be understood that, the above scenarios are only exemplary for the sake of understanding embodiments of the present disclosure. In practical use, especially in practical control process, various control functions and controls of the decision engine may be called on actual control requirements, and combined with online processing results at the cloud control center. As shown in FIG. 5, when the intelligent robot is in the online state, the decision engine may send the image signals and speech signals to the cloud control center as the cloud processing information, and the cloud control center performs the online learning, information retrieval, and knowledge question-answer on the multimodal input signal according to online resources and knowledge, or performs the learning and training on mass data, so as to perform the semantic analysis, machine translation, sentiment analysis, face recognition, speech recognition (for example, perform the motion recognition, gesture recognition, figure recognition as well as map information collecting and pre-processing via the cloud server). The decision engine may perform the voiceprint localization on the user according to the speech signal, sense the surrounding environment according to the sensor signal, and control movement mechanism of the intelligent robot according the localization results, the environment sensing results, and the analysis results (such as instructions corresponding to speeches, image recognition results, the map of surrounding area generated according to the image information) returned by the cloud control center, thus realizing movement control on the intelligent robot, such as avoiding obstacles and tracking control. The decision engine may be connected with the cloud control center via the network, thus realizing data transmission.

The decision engine may perform the primary process on the multimodal input signal, and send the processed result to the cloud control center as the cloud processing information. For example, the decision engine may divide the speech signal into speech segments and send the speech segments, or may perform the face recognition on the image signals and send the recognized face images to the cloud control center for face recognition, such that it does not need to send all the image signals, thus reducing the quantity of data transmission.

The decision engine may perform the primary process on the multimodal input signal, and send the processed result to the cloud control center as the cloud processing information. For example, the decision engine may divide the speech signal into speech segments and send the speech segments, or may perform the face recognition on the image signals and send the recognized face images to the cloud control center for face recognition, such that it does not need to send all the image signals, thus reducing the quantity of data transmission.

Furthermore, when the intelligent robot is in the offline state, it cannot communicate with the cloud control center. At this time, the decision engine may perform processing, recognition and analysis, for example, speech recognition, speech synthesis, image recognition, map generation, motion recognition, on the multimodal input signal via built-in programs. No matter whether the intelligent robot is in the online state or in the offline state, it may be controlled to work normally.

Thus, what is transmitted between the decision engine and the cloud control center is instruction-type speech segments as well as abstract and normative instructions such as "follow", or a small number of image signals, which has a small data size, and is quick to transmit and easy to process. Furthermore, the real-time data, such as the great amount of image signals and sensor signals obtained by cameras and sensors, is processed by the decision engine, thus avoiding the response delay caused by slow transmission due to the over-large data size. In this way, it may take full advantages of rapid response of the decision engine and the super strong processing capability of the cloud control center.

With the control method of the intelligent robot based on artificial intelligence according to embodiments of the present disclosure, the cloud processing information sent by the decision engine of the intelligent robot may be received and analyzed for obtaining the user demand, and then the user demand is returned to the decision engine, such that the decision engine controls the intelligent robot according to at least one of the user demand and the multimodal input signal. In this way, the cloud control center may be used to process complex natural language instructions, complex decisions and image recognition, and the local decision engine may be used to control the intelligent robot timely and rapidly according to the input signal, thus making full use of great online information and enhancing the capability of the intelligent robot for storage, calculation and processing complex decisions, while responding to the user's instruction timely, rapidly and intelligently, and improving the user experience.

In order to achieve above embodiments, the present disclosure also provides another control device of an intelligent robot based on artificial intelligence.

The control device may be applied in the cloud control center.

The control device of the intelligent robot based on artificial intelligence includes: a receiving module, configured to receive cloud processing information sent by the intelligent robot; an analyzing module, configured to analyze the cloud processing information, so as to obtain a user demand; and a returning module, configured to return the user demand to the intelligent robot.

Figure 9:
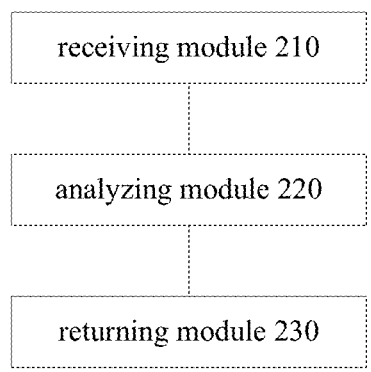
FIG. 9 is a block diagram of a control device of an intelligent robot based on artificial intelligence according to another embodiment of the present disclosure.

FIG. 9 is a block diagram of a control device of an intelligent robot based on artificial intelligence according to another embodiment of the present disclosure.

As shown in FIG. 9, the control device of the intelligent robot based on artificial intelligence according to an embodiment of the present disclosure includes a receiving module 210, an analyzing module 220 and a returning module 230.

Specifically, the receiving module 210 is configured to receive cloud processing information sent by the intelligent robot.

In embodiments of the present disclosure, the cloud processing information may be generated by the decision engine of the intelligent robot according to the multimodal input signal. The cloud processing information may include a plurality of speech segments obtained by the decision engine through dividing the speech signal input by the user, detected face images, and movement detection results (such as gesture actions, body actions), in which the multimodal input signal includes at least one of the speech signal input by the user, the image signal and the environment sensor signal. Specifically, the speech signal may be input by the user via a microphone, the image signal may be input via a camera or an infrared sensor, and the environment sensor signal includes the signal input via one or more of an optical sensor, an infrared sensor, a temperature and humidity sensor, a poisonous gas sensor, a particulate pollution sensor, a touch module, a geo-location module and a gravity sensor.

The analyzing module 220 is configured to analyze the cloud processing information, so as to obtain a user demand.

The returning module 230 is configured to return the user demand to the decision engine.

In an embodiment of the present disclosure, if the cloud processing information includes the plurality of speech segments, then the analyzing module 220 is specifically configured to: perform a speech recognition on the plurality of speech segments respectively; and perform one or more of natural language understanding, semantic analysis and sentiment analysis on a result of the speech recognition, so as to obtain the user demand.

In an embodiment of the present disclosure, if the cloud processing information is the movement detection result, then the analyzing module 220 is specifically configured to: perform a statistical analysis on the movement detection result, and compare an analysis result with a corresponding knowledge base, so as to obtain the user demand.

In an embodiment of the present disclosure, if the cloud processing information is the face image, then the analyzing module 220 is specifically configured to: perform a face recognition on the face image, and return a result of the face recognition to the intelligent robot.

In embodiments of the present disclosure, the decision engine may perform process on the multimodal input signal, for example, may perform a sound source localization and a voiceprint recognition according to the speech signal input by the user, may generate surrounding environment and a map of surrounding area according to the image signals and the environment sensor signals, or may recognize body actions, gestures and figures of the user according to the image signals.

Processing the above signals does not need a very great data processing capability and does not depend on a great amount of online knowledge data, and thus can be performed by the decision engine. However, for the processing of analyzing the user demand depending on a great amount of data, corpus and knowledge, if it is still performed by the decision engine, then problems such as process failure or long consumed time may be caused due to limited data processing capability of the decision engine. For example, for processing the speech signal, speech recognition, natural language understanding, semantic analysis, machine translation and sentiment analysis should be performed, which requires a great amount of corpus and data for training; for interacting with the user, it requires to analyze the meanings of the user's speech and actions and to determine the response content via knowledge question-answer. Thus, in this case, the speech signals should be sent to the cloud control center, such that the cloud control center analyzes the speech signals with the super strong storage and data processing capability, so as to obtain the user demand. Then, the decision engine controls the intelligent robot according to the user demand in combination with the multimodal input signal.

Detailed descriptions may refer to application scenario examples shown in FIGS. 2-4.

It should be understood that, the above scenarios are only exemplary for the sake of understanding embodiments of the present disclosure. In practical use, especially in practical control process, various control functions and controls of the decision engine may be called on actual control requirements, and combined with online processing results at the cloud control center. As shown in FIG. 5, when the intelligent robot is in the online state, the decision engine may send the image signals and speech signals to the cloud control center as the cloud processing information, and the cloud control center performs the online learning, information retrieval, and knowledge question-answer on the multimodal input signal according to online resources and knowledge, or performs the learning and training on mass data, so as to perform the semantic analysis, machine translation, sentiment analysis, face recognition, speech recognition (for example, perform the motion recognition, gesture recognition, figure recognition as well as map information collecting and pre-processing via the cloud server). The decision engine may perform the voiceprint localization on the user according to the speech signal, sense the surrounding environment according to the sensor signal, and control movement mechanism of the intelligent robot according the localization results, the environment sensing results, and the analysis results (such as instructions corresponding to speeches, image recognition results, the map of surrounding area generated according to the image information) returned by the cloud control center, thus realizing movement control on the intelligent robot, such as avoiding obstacles and tracking control. The decision engine may be connected with the cloud control center via the network, thus realizing data transmission.

The decision engine may perform the primary process on the multimodal input signal, and send the processed result to the cloud control center as the cloud processing information. For example, the decision engine may divide the speech signal into speech segments and send the speech segments, or may perform the face recognition on the image signals and send the recognized face images to the cloud control center for face recognition, such that it does not need to send all the image signals, thus reducing the quantity of data transmission.

The decision engine may perform the primary process on the multimodal input signal, and send the processed result to the cloud control center as the cloud processing information. For example, the decision engine may divide the speech signal into speech segments and send the speech segments, or may perform the face recognition on the image signals and send the recognized face images to the cloud control center for face recognition, such that it does not need to send all the image signals, thus reducing the quantity of data transmission.

Furthermore, when the intelligent robot is in the offline state, it cannot communicate with the cloud control center. At this time, the decision engine may perform processing, recognition and analysis, for example, speech recognition, speech synthesis, image recognition, map generation, motion recognition, on the multimodal input signal via built-in programs. No matter whether the intelligent robot is in the online state or in the offline state, it may be controlled to work normally.

Thus, what is transmitted between the decision engine and the cloud control center is instruction-type speech segments as well as abstract and normative instructions such as "follow", or a small number of image signals, which has a small data size, and is quick to transmit and easy to process. Furthermore, the real-time data, such as the great amount of image signals and sensor signals obtained by cameras and sensors, is processed by the decision engine, thus avoiding the response delay caused by slow transmission due to the over-large data size. In this way, it may take full advantages of rapid response of the decision engine and the super strong processing capability of the cloud control center.

With the control device of the intelligent robot based on artificial intelligence according to embodiments of the present disclosure, the cloud processing information sent by the decision engine of the intelligent robot may be received and analyzed for obtaining the user demand, and then the user demand is returned to the decision engine, such that the decision engine controls the intelligent robot according to at least one of the user demand and the multimodal input signal. In this way, the control device may be used to process complex natural language instructions, complex decisions and image recognition, and the local decision engine may be used to control the intelligent robot timely and rapidly according to the input signal, thus making full use of great online information and enhancing the capability of the intelligent robot for storage, calculation and processing complex decisions, while responding to the user's instruction timely, rapidly and intelligently, and improving the user experience.

The intelligent robot in the present disclosure has an open system platform, which can be updated continuously. The intelligent robot is matched with an open operating system platform. With the open interface protocol, various content providers may develop all kinds of content and applications for the intelligent robot. In the software aspect, by connecting to the network via WiFi, the intelligent robot may update the software of itself continuously, the cloud system may also obtain the huge amount of new information in the internet without a break all day, such that the user no longer needs to perform the complicated updating operation, which may be completed in the background the intelligent robot silently.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

It should be noted that, in the description of the present disclosure, terms such as "first" and "second" are used herein for purposes of description and are not intended to indicate or imply relative importance or significance. Furthermore, in the description of the present disclosure, "a plurality of" refers to two or more unless otherwise specified.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the functions may be executed in other orders instead of the order illustrated or discussed, including in a basically simultaneous manner or in a reverse order, which should be understood by those skilled in the art.

The logic and/or steps described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A control system of an intelligent robot based on artificial intelligence, comprising:
a decision engine, disposed on the intelligent robot, and configured to receive a preset speech input by the user, to control the intelligent robot to enter a speech instruction monitoring mode based on the preset speech, to receive a speech input by the user under the speech instruction monitoring mode, to divide the speech into a plurality of speech segments as cloud processing information, and to send the plurality of speech segments to a cloud control center for analyzing, to obtain a user demand as a movement control demand obtained by the cloud control center based on the speech segments corresponding to the speech, to obtain a location of the user based on the movement control demand, to generate a map of surrounding area according to at least one of an image signal received by the intelligent robot and an environment sensor signal received by the intelligent robot, to sense surrounding environment, and to control the intelligent robot to move on the user demand according to the location of the user, the map of surrounding area and the surrounding environment; and the cloud control center, configured to receive the plurality of speech segments, to perform a speech recognition on the plurality of speech segments respectively and to perform one or more of natural language understanding, semantic analysis and sentiment analysis on a result of the speech recognition, so as to obtain the user demand, and to return the user demand to the decision engine.

2. The system according to claim 1, wherein the user demand is a way-finding demand, and the decision engine is configured to:

obtain a current location and a target location of the intelligent robot, and control the intelligent robot to indicate directions or guide directions via speech interaction, according to the map of surrounding area as well as the current location and the target location of the intelligent robot.

3. The system according to claim 1, wherein the decision engine is configured to detect a movement of the user according to at least one of the image signal and the environment sensor signal and to take a movement detection result as the cloud processing information according to a preset rule, the cloud control center is configured to perform a statistical analysis on the movement detection result and to compare an analysis result with a corresponding knowledge base, so as to obtain the user demand.

4. The system according to claim 3, wherein the decision engine is configured to control the intelligent robot to send a prompt message to a preset mobile terminal according to the user demand.

5. The system according to claim 1, wherein the decision engine is further configured to:

perform a face detection on the image signal;

if the image signal is a face image signal, send the face image signal to the cloud control center for face recognition; and determine identity information of the user according to a result of the face recognition.

6. A control method of an intelligent robot based on artificial intelligence, comprising:

receiving, by a decision engine of the intelligent robot, a preset speech input by the user;

controlling, by the decision engine of the intelligent robot, the intelligent robot to enter a speech instruction monitoring mode based on the preset speech;

receiving, by the decision engine of the intelligent robot, a speech input by the user under the speech instruction monitoring mode;

dividing, by the decision engine of the intelligent robot, the speech into a plurality of speech segments as cloud processing information;

sending, by the decision engine of the intelligent robot, the plurality of speech segments to a cloud control center for analyzing, to obtain a user demand as a movement control demand obtained by the cloud control center based on the speech segments corresponding to the speech;

obtaining, by the decision engine of the intelligent robot, a location of the user based on the movement control demand;

generating, by the decision engine of the intelligent robot, a map of surrounding area according to at least one of an image signal received by the intelligent robot and an environment sensor signal received by the intelligent robot;

sensing, by the decision engine of the intelligent robot, surrounding environment; and controlling, by the decision engine of the intelligent robot, the intelligent robot to move on the user demand according to the location of the user, the map of surrounding area and the surrounding environment.

7. The method according to claim 6, wherein the user demand is a way-finding demand, and the method further comprises:

obtaining a current location and a target location of the intelligent robot by the decision engine;

controlling the intelligent to indicate directions or guide directions via speech interaction, by the decision engine according to the map of surrounding area as well as the current location and target location of the intelligent robot.

8. The method according to claim 6, wherein, generating by a decision engine of the intelligent robot cloud processing information according to a multimodal input signal received by the intelligent robot comprises:

detecting a movement of the user according to at least one of the image signal and the environment sensor signal, and taking a movement detection result as the cloud processing information according to a preset rule.

9. The method according to claim 8, wherein controlling the intelligent robot by the decision engine according to at least one of the user demand and the multimodal input signal comprises:

controlling the intelligent robot to send a prompt information to a preset mobile terminal according to the user demand.

10. The method according to claim 6, further comprising:

performing a face detection on the image signal by the decision engine;

if the image signal is a face image signal, sending the face image signal to the cloud control center for face recognition; and determining identity information of the user according to a result of the face recognition.

11. A control device of an intelligent robot based on artificial intelligence, comprising:

a processor;

a memory configured to store an instruction executable by the processor;

wherein the processor is configured to:

receive a preset speech input by the user;

control the intelligent robot to enter a speech instruction monitoring mode based on the preset speech;
receive a speech input by the user under the speech instruction monitoring mode;
divide the speech into a plurality of speech segments as cloud processing information;
send the plurality of speech segments to a cloud control center for analyzing, to obtain a user demand as a movement control demand obtained by the cloud control center based on the speech segments corresponding to the speech;
obtain a location of the user based on the movement control demand;
generate a map of surrounding area according to at least one of an image signal received by the intelligent robot and an environment sensor signal received by the intelligent robot;
sense surrounding environment; and
control the intelligent robot to move on the user demand according to the location of the user, the map of surrounding area and the surrounding environment.

12. The device according to claim 11, wherein the user demand is a way-finding demand, and the processor is configured to:
obtain a current location and a target location of the intelligent robot, and control the intelligent robot to indicate directions or guide directions via speech interaction, according to the map of surrounding area as well as the current location and the target location of the intelligent robot.

* * * * *